US009221212B2

(12) United States Patent
Velten et al.

(10) Patent No.: US 9,221,212 B2
(45) Date of Patent: Dec. 29, 2015

(54) METHOD FOR PRODUCTION OF COMPOSITE PREFORM

(71) Applicant: Airbus Operations GmbH, Hamburg (DE)

(72) Inventors: Jons Velten, Freiburg im Breisgau (DE); Adam Andrae, Freiburg im Breisgau (DE); Niels Deschauer, Freiburg im Breisgau (DE); Tassilo Witte, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 78 days.

(21) Appl. No.: 14/133,018

(22) Filed: Dec. 18, 2013

(65) Prior Publication Data

US 2014/0166195 A1   Jun. 19, 2014

Related U.S. Application Data

(60) Provisional application No. 61/738,428, filed on Dec. 18, 2012.

(30) Foreign Application Priority Data

Dec. 18, 2012   (EP) .................................... 12197776

(51) Int. Cl.
  *B29C 70/30*   (2006.01)
  *B29C 53/04*   (2006.01)
  *B29B 11/16*   (2006.01)
  *B29C 70/08*   (2006.01)

(52) U.S. Cl.
  CPC ................. *B29C 53/04* (2013.01); *B29B 11/16* (2013.01); *B29C 70/085* (2013.01); *Y10T 156/1028* (2015.01); *Y10T 156/1044* (2015.01)

(58) Field of Classification Search
  None
  See application file for complete search history.

(56) References Cited

U.S. PATENT DOCUMENTS

| 4,177,306 A * | 12/1979 | Schulz et al. ................. 428/107 |
| 7,507,446 B2 | 3/2009 | Koerwien et al. |
| 7,655,581 B2 | 2/2010 | Goering |
| 8,105,523 B2 | 1/2012 | Edelmann et al. |
| 2013/0136588 A1 | 5/2013 | Olivier |

FOREIGN PATENT DOCUMENTS

GB   2486231 A  *  6/2012

OTHER PUBLICATIONS

European Searching Authority, European Search Report for 12197776.3 Dated Apr. 6, 2013.

* cited by examiner

*Primary Examiner* — Barbara J Musser
(74) *Attorney, Agent, or Firm* — Ingrasia Fisher & Lorenz, P.C.

(57) ABSTRACT

A method of producing a composite preform having a profile with variable profile height or width is provided. The method includes: providing a plurality of first fiber layers overlapping or upon one another in or substantially parallel to a primary plane; inserting a second fiber layer via a guide member between two of the first fiber layers at an edge region of the preform profile, such that the second fiber layer extends substantially parallel to the first fiber layers; and positioning the edge region of the preform profile, and thus respective edge regions of the first fiber layers, out of the primary plane to set or determine a dimension of the preform profile in the primary plane.

11 Claims, 3 Drawing Sheets

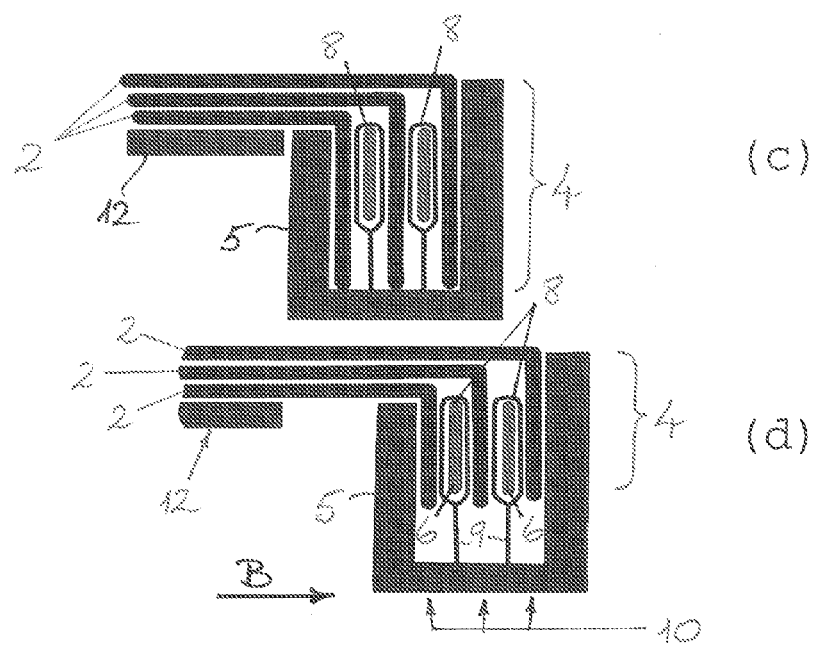
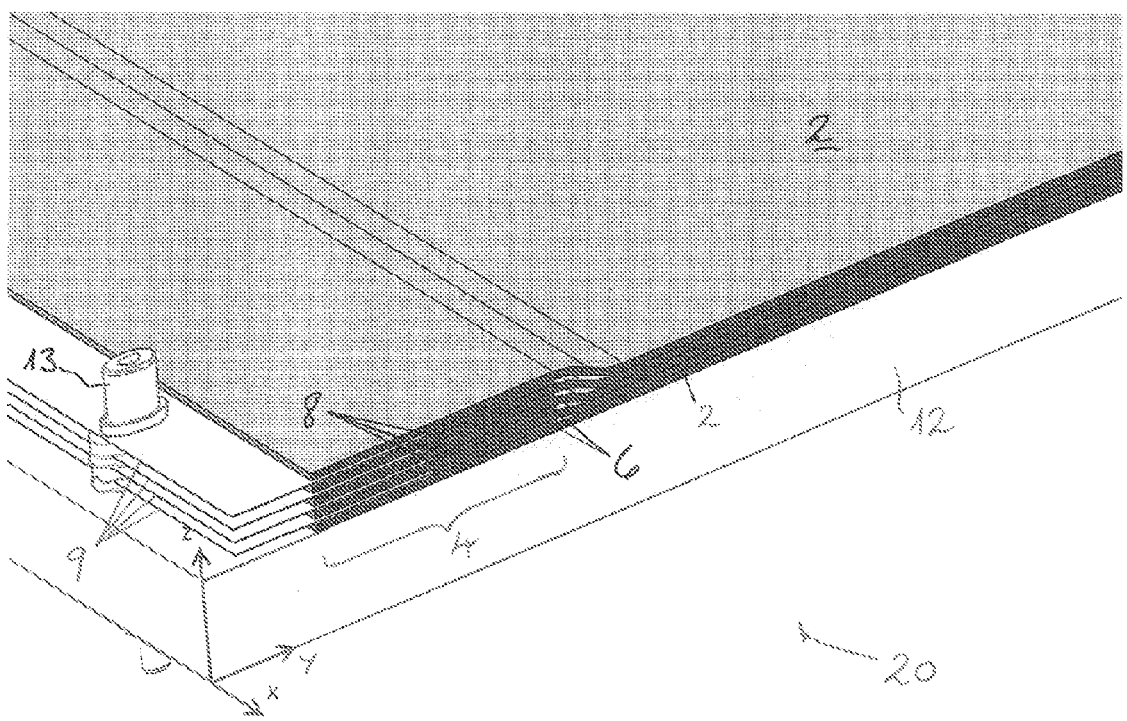
Fig. 2
Fig. 3

METHOD FOR PRODUCTION OF COMPOSITE PREFORM

CROSS-REFERENCES TO RELATED APPLICATIONS

This application claims priority to U.S. Provisional Patent Application No. 61/738,428, filed Dec. 18, 2012, and to European Patent Application No. 12 197 776.3, filed Dec. 18, 2012, which are each incorporated herein by reference in their entirety.

TECHNICAL FIELD

This application pertains to a method and apparatus for production of a fibre-reinforced composite preform having a profile with a variable profile height or width dimension. In this regard, the technical field particularly concerns a method and apparatus with which one or more unidirectional (UD) fibre layers may be integrated in a composite preform, and especially between multi-axial fibre layers. The technical field also relates to a fibre-reinforced composite preform produced by such a method or apparatus, for example, in a continuous or semi-continuous process, as well as to a corresponding fibre-reinforced composite component.

BACKGROUND

Currently, there are no practical automated or semi-automated processes available for integrating unidirectional (UD) fibre layers between multi-axial fibre layers of a fibre-reinforced composite preform, especially when there is a variable web or profile height in the composite preform profile. Accordingly, to date it has simply been impractical to integrate UD fibre layers between multi-axial fibre layers, as this would be a complex and painstaking manual procedure that would require each layer of the preform being individually or separately shaped for application of a respective UD fibre layer.

In addition, other objects, desirable features and characteristics will become apparent from the subsequent summary and detailed description, and the appended claims, taken in conjunction with the accompanying drawings and this background.

SUMMARY

According to various embodiments, provided is a new technique for production of a composite preform having a profile with variable height or width and incorporating one or more additional fibre layer, such as a unidirectional (UD) fibre layer, generally using an automated or semi-automated procedure.

In accordance with the various teachings of the present disclosure, a method and an apparatus are provided for production of a fibre-reinforced composite preform profile, especially a composite preform profile with variable profile height or width.

According to various embodiments, therefore, the application provides a method of producing a composite preform having a profile with variable profile height or width, the method comprising: providing a plurality of first fibre layers stacked and/or overlapping one another and extending in or substantially parallel to a primary plane; inserting at least one second fibre layer between two of the first fibre layers at an edge region of the preform profile, whereby the at least one second fibre layer extends substantially parallel to the first fibre layers; and positioning the edge region of the preform profile, and thus respective edge regions of the first fibre layers, out of the primary plane to set or determine a dimension of the preform profile in the primary plane.

It will be appreciated that positioning the edge region of the preform profile out of the primary plane generally concerns a relative movement. Thus, the edge region itself may be moved directly relative to the primary plane, or a height or width part of the preform profile defining the primary plane may be moved directly relative to the edge region, or both of these together. Ultimately, however, the moving results in at least part of the edge region of the preform profile no longer lying in the primary plane that defines a relevant dimension (e.g. a web height or width) of the profile. Thus, by positioning an edge region of the preform profile out of the primary plane, the method of the application both forms a shape of the composite preform profile and, at the same time, sets or determines the height or width dimension in the primary plane. In this way, the method is able to vary or regulate a height or width of the profile in the primary plane through an adjustment and/or modification to the positioning or relative movement of the edge region of the profile. In other words, the way in which the edge region of the preform profile is moved influences a height or width of the profile, as well as a final shape of the profile.

In one embodiment, positioning the edge region of the preform profile may include bending or displacing the edge region of the preform profile, and thereby the respective edge regions of the first fibre layers, through an angle out of the primary plane. In this embodiment, positioning the edge region of the preform profile generally further includes: displacing the edge region of the preform profile, and thus the respective edge regions of the first fibre layers, in a direction substantially parallel to the primary plane. Thus, the positioning or movement of the edge region of the preform profile to vary or regulate the height or width dimension of the profile in the primary plane desirably involves at least one, and in one example, both, of bending displacement of the edge region and/or translational displacement of the profile edge region.

In various embodiments, the first fibre layers arranged upon or adjacent one another in or substantially parallel to a primary plane include one or more multi-axial fibre layers. Furthermore, the at least one second fibre layer generally comprises a unidirectional (UD) fibre layer. As such, the method is specifically adapted for incorporating at least one UD fibre layer between multi-axial fibre layers of a composite preform profile. In this regard, inserting at least one second fibre layer between two of the first fibre layers generally involves guiding the second fibre layer(s) between respective first fibre layers. Furthermore, the first and second fibre layers are generally arranged upon or adjacent one another in a semi-continuous or substantially continuous process; for example, by drawing or feeding the fibre layers from a stock supply.

Accordingly, in one exemplary embodiment, providing the first fibre layers stacked and/or overlapping one another includes feeding or drawing the first layers from respective rolls or a supply in parallel over one another. Further, inserting the second fibre layers between two of the first fibre layers at the edge region of the preform profile includes feeding or drawing the second layer from a roll or a supply in parallel with the first layers. The first and second layers are in one example, fed or supplied simultaneously and synchronously, i.e. at substantially the same speed, in the production of the composite preform.

In various embodiments, inserting the at least one second fibre layer between two of the first fibre layers at an edge region of the preform profile includes: arranging a respective guide member for each second fibre layer between two first fibre layers at the edge region of the profile, and guiding or feeding the at least one second fibre layer between the first fibre layers via the respective guide member(s). In this embodiment, after positioning the edge region of the profile, the method may include drawing the second fibre layer out of the guide member arranged between the first fibre layers at the edge region of the preform profile.

Thus, according to various embodiments, the present disclosure provides a method of producing a composite preform having a profile with variable profile height or width, the method comprising: providing a plurality of first fibre layers overlapping or upon one another in or substantially parallel to a primary plane of the preform profile; introducing a second fibre layer via a guide between two of the first fibre layers at an edge region of the preform profile, whereby the second fibre layer extends substantially parallel to the first fibre layers; and positioning or moving the edge region of the preform profile, and thus also respective edge regions of the first fibre layers, out of the primary plane to set or determine a dimension of the preform profile in the primary plane.

In one embodiment, each guide or guide member comprises a sheath, sleeve, or channel, which at least partially surrounds or envelops the second fibre layer. For example, each second fibre layer may comprise a substantially flat strip which is held, guided and/or enveloped by a thin, hollow sheath, channel or sleeve. The second fibre layer(s) may thus be arranged between two of the first fibre layers at the edge region of the preform profile by arranging each guide member (e.g. sheath or sleeve) between the first fibre layers at that edge region. Introducing a second fibre layer via the guide may therefore include feeding or drawing the second fibre layer through and out of the guide member. Each second fibre layer can desirably be fed or drawn in a longitudinal direction through the respective sheath or sleeve, the second fibre layer typically being provided as substantially flat strip. Thus, each second fibre layer may be fed or drawn in a direction substantially parallel to the fibres of the second fibre layer and/or parallel to the respective edge regions of the first fibre layers.

In various embodiments, inserting a second fibre layer between the first fibre layers includes respectively arranging each of a plurality of guide members between adjacent pairs of said first fibre layers at the edge region of the preform profile, and feeding or guiding a second fibre layer through each of the respective plurality of guide members, whereby each of the plurality of second fibre layers extends in a plane substantially parallel to the first fibre layers. In this way, the method is adapted for incorporating multiple UD fibre layers within a stack of the multi-axial fibre layers of a composite preform profile.

In one exemplary embodiment, the guide member or each guide member is mounted in or attached to a forming member that is configured to position or move the edge region of the preform profile, and thereby form a final shape of the profile. In this regard, the forming member may engage and/or encompass at least part of the edge region of the preform profile, and thereby also part of the respective edge regions of the first fibre layers. Furthermore, the forming member may be movable to thereby position the edge region of the profile out of the primary plane. That is, the forming member may be configured to move through a predetermined angle out of the primary plane and/or to displace in translation substantially parallel to the primary plane. The forming member may have a number of slots for receiving the respective edge regions of the first fibre layers, with each guide member being mounted between a pair of adjacent slots for effecting placement of the second fibre layer(s) in the edge region of the preform profile.

According to various embodiments, the application provides a preform for a fibre-reinforced composite component produced according to the method various embodiments described herein.

According to various embodiments, the application also provides a fibre-reinforced composite component which is produced or formed from such a preform according to the various teachings of the present disclosure.

According to various embodiments, the present application provides an apparatus for production of a composite preform having a profile with variable profile height or width, comprising: a frame for supporting a plurality of first fibre layers arranged overlapping or upon one another in or substantially parallel to a primary plane; at least one guide member for guiding a second fibre layer, wherein each guide member is configured to be arranged between two of the first fibre layers at an edge region of the preform profile, such that the second fibre layer is fed or guided to extend in a plane substantially parallel to the first fibre layers; and a forming member in or upon which the at least one guide member is mounted, the forming member being configured to engage and/or to encompass part of the edge region of the preform profile, wherein the forming member is positionable or movable with respect to the frame to set or determine a dimension of the profile in the primary plane.

In one embodiment, the at least one guide member comprises a sheath, sleeve, or channel to at least partially surround or envelop the second fibre layer. Exemplarily, the guide member forms a channel or conduit, through which the second fibre layer is conveyed. This may, for example, be by drawing or feeding the second fibre layer through the sheath or sleeve in a direction parallel to its longitudinal extent or to its fibres, and/or in a direction parallel to the edge region of the preform profile.

In various embodiments, the forming member is movable or positionable with respect to the frame to bend or displace the edge region of the preform profile (and thus also the respective edge regions of the first fibre layers) through an angle out of the primary plane. Exemplarily, also, the forming member is movable with respect to the frame to displace the (e.g. bent) edge region of the preform profile in a direction substantially parallel to the primary plane.

In various embodiments, the first and second fibre layers are arranged upon and/or adjacent one another in a semi-continuous or substantially continuous process; for example, by drawing or supplying the first and second fibre layers into the apparatus from a stock, such as respective rolls of multi-axial carbon-fibre sheets and unidirectional (UD) carbon-fibre strips.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2 is a schematic illustration showing a detailed view of the apparatus for performing stages (c) and (d) in the method of FIG. 1;

FIG. 3 is a schematic perspective view of an apparatus for producing a composite preform profile according to various embodiments.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
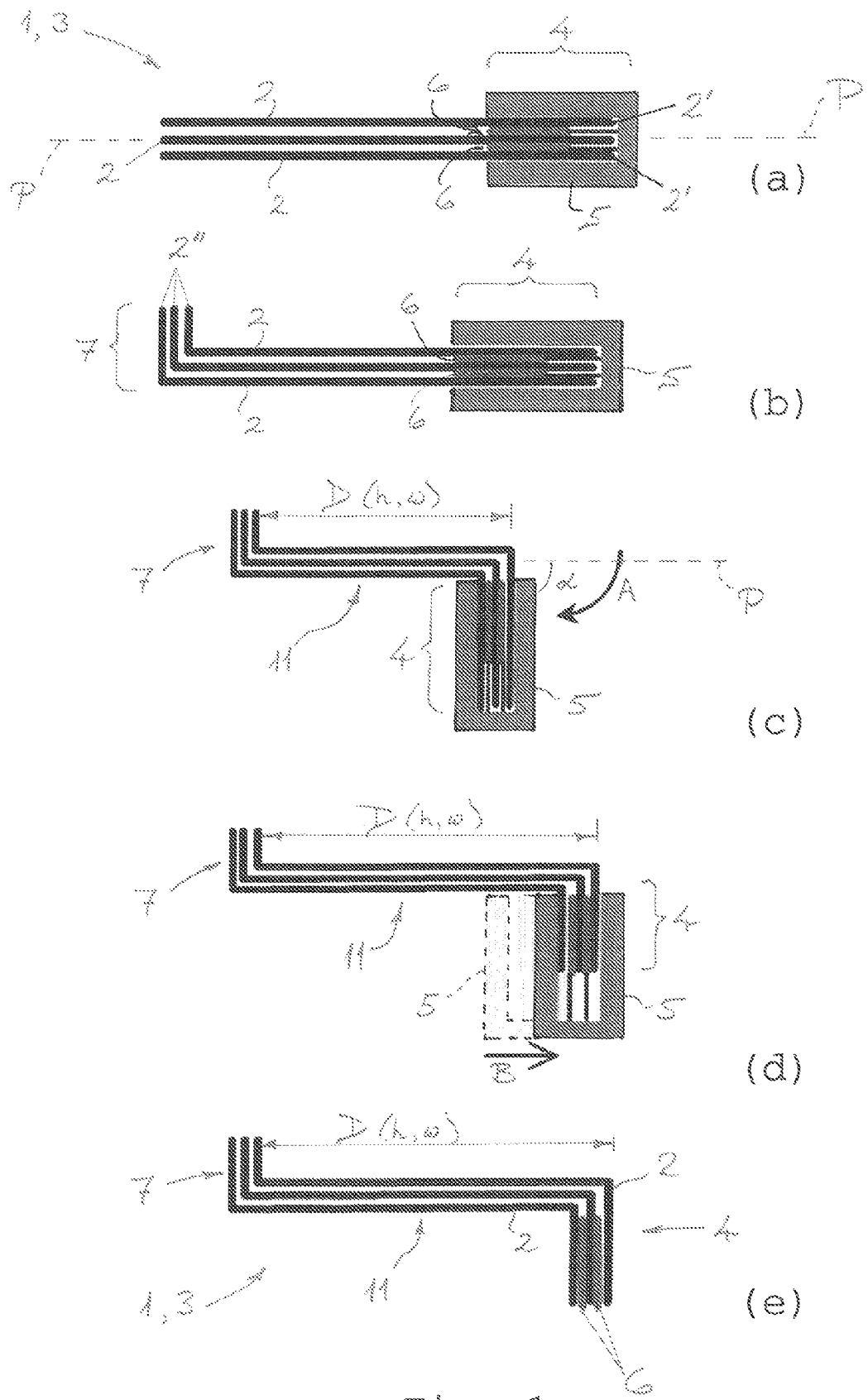
FIG. 1 is a schematic illustration in side or section view of the stages (a) to (e) in a method of producing a composite preform profile with variable profile height or width according to various embodiments.

With reference firstly to FIG. 1 of the drawings, an example of a method according to various embodiments is schematically illustrated by stages (a) to (e) in the production of a composite preform 1 according to the various teachings of the present disclosure. Stage (a) of the method illustrates schematically providing a plurality of first fibre layers 2 (for the sake of simplicity, three of these layers 2 are shown) in the form of sheets having multi-axial carbon-fibres and arranged in neatly overlapping stack one upon the other. In this regard, it will be appreciated that the three first fibre layers or sheets 2 are illustrated in cross-section and thereby represent a sectional profile 3 of the composite preform 1. The multi-axial first fibre layers 2 are supported upon a frame (not shown) and extend substantially parallel to one another and define a primary plane P of the preform profile 3.

An edge region 4 of the preform profile 3, which naturally corresponds to respective edge regions 2' of the first fibre layers 2, is encompassed by a forming member 5 which has a generally C- or U-shaped channel configuration. Within this forming member 5 two second fibre layers 6, such as e.g. uni-directional carbon-fibre strips, are arranged between each respectively adjacent pair of the first fibre layers 2. Thus, in this simplified example, the upper and middle multi-axial fibre layers 2 form a first pair between which one UD fibre layer or strip 6 is arranged, and the middle and lower multi-axial fibre layers 2 form a second pair between which another UD fibre layer 6 is arranged. These two UD fibre layers 6 are therefore provided at the edge region 4 of the cross-section or profile 3 and extend in a plane that is substantially parallel to the first fibre layers 2.

In stage (b) of FIG. 1, it can be seen that an opposite edge region 7 of the cross-section or profile 3 of the composite preform 1, which comprises respective edge regions 2" of the three multi-axial first fibre layers 2, is bent upwards or rotated in a clockwise direction through an angle of about 90 degrees out of the primary plane P. This edge region 7 of the cross-section or preform profile 3 thereby forms a flange in the composite preform 1 being produced.

Referring also now to FIG. 2 of the drawings, the stages (c) and (d) of the method schematically illustrated in FIG. 1 and the configuration and nature of the forming member 5 are seen in more detail. In stage (c) shown in FIG. 1 and FIG. 2, the edge region 4 of the profile 3, and thus also respective edge regions 2' of the first fibre layers 2, are displaced or bent through an angle α (e.g. about 90 degrees) out of the primary plane P in the direction of arrow A. Referring particularly to FIG. 2, it can be seen that each second fibre layer or strip 6 is fed or introduced between the first fibre layers 2 via a guide member 8 provided in the form of a sheath or sleeve. That is, each sheath or sleeve 8 substantially or essentially envelops a respective UD fibre layer or strip 6 and is mounted in the generally U-shaped forming member or forming channel 5 via a respective connecting element 9. In this way, the forming channel 5 defines slots 10 for receiving the respective edge regions 2' of the multi-directional first fibre layers 2.

As shown schematically in stage (d) of FIG. 1 and FIG. 2, the forming member 5 is then positioned or moved in translational displacement in the direction of arrow B substantially parallel to the primary plane P to set or determine a height h or width w of the preform cross-section or profile 3 in this primary plane. In other words, the height h or width w of a central web 11 of the profile 3 is set or determined by this translational movement of the forming member 5. It will be understood by persons skilled in the art that reference to the web dimension D as a height h or a width w will merely depend on the particular orientation of the profile 3 in use (i.e. vertically oriented dimension is ordinarily understood as a height, whereas a horizontally oriented dimension is ordinarily understood as a width). In the present case, however, the same dimension D is intended. As can be clearly seen in FIG. 2, a displacement of the forming member 5 in the direction of arrow B causes the edge regions 2' of the multi-axial first fibre layers 2 to be drawn into close alignment with the UD second fibre layers 6. This movement of the forming member 5 therefore also sets or determines the width of a flange formed at this edge region 4 of the profile 3.

Stage (e) illustrated in FIG. 1 shows the completed profile 3 of the composite preform 1. To achieve the completed preform profile 3 shown in stage (e) from stage (d), the first and second fibre layers 2, 6 at the edge region 4 of the profile are drawn or conveyed from the guide sleeves 8 and forming member 5. That is, each of the sheaths or sleeves 8 guiding the individual UD fibre layers 6 is held in position and the UD fibre layers 6 are introduced between the respective multi-axial fibre layers by feeding or drawing the respective UD fibre layers 6 through each of the sheaths or sleeves 8 in a direction perpendicular to the plane of the drawing shown in stage (d). In this way, each sheath or sleeve 8 guides or directs the strip-like second fibre layer 6 in a longitudinal direction of these layers 6 (i.e. typically corresponding to an extent of the unidirectional fibres). The strip-like UD fibre layers 6 are thus drawn from and exit an opposite end of the guide members or sleeves 8 to be retained respectively between two adjacent multi-axial first fibre layers 2. In a similar manner, the multi-axial first layers or sheets 2 are fed or drawn synchronously with the UD strips 6. After the forming procedure is completed at the edge region 4, the now formed profile 3, with the first and second and second fibre layers 2, 6 interleaved in the edge region 4, are fed, drawn or conveyed further and thereby pass through and exit forming member 5.

With reference now to FIG. 3 of the drawings, an apparatus 20 according to various embodiments for producing a composite preform 1 having such a cross-section or profile 3 is partially shown in perspective view. This apparatus 20 includes a frame 12 for supporting a plurality of the multi-axial first fibre layers 2 arranged overlapped and/or stacked upon each other and extending parallel to a primary plane P as shown in FIG. 1. Further, the apparatus 20 includes four guide members 8 in the form of thin tubular sheaths or sleeves for guiding or directing a respective second fibre layer 6, each one of which is arranged inserted between, or interleaved with, the first fibre layers 2, at an edge region 4 of the preform profile 3, such that each unidirectional second fibre layer 6 is introduced there-through to extend or lie in a plane substantially parallel to the first fibre layers 2. The sheath- or sleeve-like guide members 8 are mounted or attached to a forming member 5 via fin-like connecting members 9 and a screw or bolt fastener 13. The forming member 5 is configured to engage the edge region 4 of the preform profile 3, and is movable to set or determine a dimension D of the profile 3 in the primary plane P via the method described with respect to FIG. 1 and FIG. 2.

Figure 4:
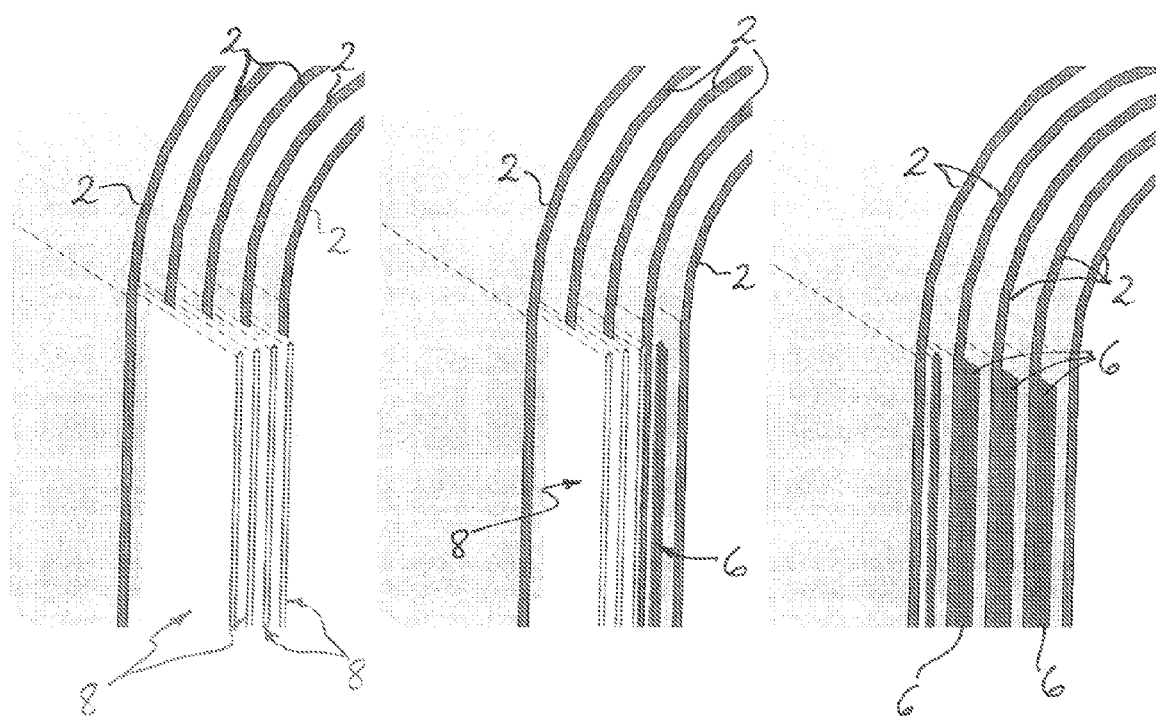
FIG. 4 are schematic perspective views of three moments in progression to stage (e) of the method in FIG. 1.

FIG. 4 of the drawings illustrates progressive stages in introducing second UD fibre layers 6 between adjacent first multi-axial fibre layers 2 by feeding or drawing the UD fibre layers 6 through the sheath- or sleeve-like guides 8 of the apparatus to insert the UD fibre layers 6 and leave them deposited between the adjacent first fibre layers 2 in the flange formed at the edge region 4 of the profile 3. In this regard, the left-hand image shows the sheath- or sleeve-like guide members 8 in position between the multi-axial fibre layers 2, which corresponds to stage (d) in FIGS. 1 and 2; the middle image shows the UD fibre layers 6 beginning to emerge from the sheath- or sleeve-like guide members 8 as they are fed or drawn through; and the right-hand image shows ends of the UD fibre layers 6 exposed between the multi-axial fibre layers 2 after emergence through the guide members 8.

As will be appreciated by those of ordinary skill in the art, the method of producing a composite preform includes impregnating the first and second fibre layers 2, 6 with a hardenable polymer resin material. The method also includes applying that polymer resin material to the respective fibre layers 2, 6, which may be carried out or performed at the appropriate time, as determined by the skilled person. After the preform profile 3 is formed, the composite preform 1 may be consolidated and the polymer resin material can be hardened or cured (e.g. at an elevated temperature and/or pressure) to produce a fibre-reinforced composite component.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method of producing a composite preform having a preform profile of variable profile height or width, the method comprising:
   providing a plurality of first fibre layers arranged upon or overlapping one another substantially parallel to a primary plane;
   inserting at least one second fibre layer between two of the plurality of first fibre layers at an edge region of the preform profile, whereby the second fibre layer extends substantially parallel to the first fibre layers; and
   positioning the edge region of the preform profile, and thereby respective edge regions of the plurality of first fibre layers, out of the primary plane to set or determine a dimension of the preform profile in the primary plane;
   wherein inserting at least one second fibre layer between two of the plurality of first fibre layers at the edge region of the preform profile comprises: guiding or feeding the at least one second fibre layer via a guide member arranged between said two of the plurality of first fibre layers at the edge region of the preform profile.

2. The method according to claim 1, wherein positioning the edge region of the preform profile includes: displacing or bending the edge region of the preform profile, and thereby the respective edge regions of the plurality of first fibre layers, through an angle out of the primary plane.

3. The method according to claim 1, wherein positioning the edge region of the preform profile further includes: displacing the edge region of the preform profile, and thus the respective edge regions of the plurality of first fibre layers, in a direction parallel to the primary plane.

4. The method according to claim 1, wherein the guide member comprises a sheath or sleeve that at least partially surrounds or envelops the at least one second fibre layer, and wherein inserting the at least one second fibre layer includes drawing or conveying the at least one second fibre layer through the sheath or sleeve.

5. The method according to claim 4, wherein drawing or conveying the at least one second fibre layer through the sheath or sleeve comprises drawing or conveying the at least one second fibre layer though the sheath or sleeve in a direction substantially parallel to the fibres of the at least one second fibre layer.

6. The method according to claim 4, wherein drawing or conveying the at least one second fibre layer through the sheath or sleeve comprises drawing or conveying the at least one second fibre layer though the sheath or sleeve in a direction substantially parallel the respective edge regions of the plurality of first fibre layers.

7. The method according to claim 1, wherein inserting at least one second fibre layer includes inserting a plurality of second fibre layers, and the method further comprises:
   providing a plurality of guide members for the plurality of second fibre layers, each being arranged between two of the plurality of first fibre layers at the edge region of the preform profile, whereby each of the plurality of second fibre layers extends in a plane substantially parallel to the plurality of first fibre layers.

8. The method according to claim 1, wherein the guide member is mounted in or attached to a forming member which engages or encompasses the edge region of the preform profile, and thereby also the respective edge regions of the plurality of first fibre layers.

9. The method according to claim 8, wherein positioning the edge region of the preform profile, and thereby also the respective edge regions of the plurality of first fibre layers, comprises moving the forming member.

10. The method according to claim 1, wherein the at least one second fibre layer comprises a unidirectional fibre layer.

11. The method according to claim 1, wherein the plurality of first fibre layers include one or more multi-axial fibre layers.

* * * * *